(12) United States Patent
Languedoc et al.

(10) Patent No.: US 9,562,611 B2
(45) Date of Patent: Feb. 7, 2017

(54) CONTROLLED ISOLATION VALVE HAVING REINFORCED SEALING

(75) Inventors: Christian Languedoc, Port Mort (FR); Georges Verdier, Tourny (FR)

(73) Assignee: SNECMA, Paris (FR)

( * ) Notice: Subject to any disclaimer, the term of this patent is extended or adjusted under 35 U.S.C. 154(b) by 664 days.

(21) Appl. No.: 13/880,583

(22) PCT Filed: Oct. 12, 2011

(86) PCT No.: PCT/FR2011/052375
§ 371 (c)(1),
(2), (4) Date: May 21, 2013

(87) PCT Pub. No.: WO2012/052659
PCT Pub. Date: Apr. 26, 2012

(65) Prior Publication Data
US 2013/0228242 A1    Sep. 5, 2013

(30) Foreign Application Priority Data
Oct. 22, 2010   (FR) ...................................... 10 58666

(51) Int. Cl.
| F16K 1/50 | (2006.01) |
| F16K 1/20 | (2006.01) |
| F16K 31/44 | (2006.01) |

(52) U.S. Cl.
CPC ............... *F16K 1/2007* (2013.01); *F16K 1/50* (2013.01); *F16K 31/44* (2013.01); *Y10T 137/7898* (2015.04)

(58) Field of Classification Search
CPC .......... F16K 1/2007; F16K 1/50; F16K 31/44; F16K 1/20; F16K 1/18
USPC ......................... 251/299, 300, 114, 115, 116
See application file for complete search history.

(56) References Cited

U.S. PATENT DOCUMENTS

| 2,469,831 | A | * | 5/1949 | Lewis | ................... | F16K 1/2057 169/19 |
| 2,597,474 | A | * | 5/1952 | Griffith | ................. | F16K 1/2057 169/19 |
| 2,644,479 | A | * | 7/1953 | Rowley | ................. | F16K 1/2014 137/312 |
| 3,268,202 | A | * | 8/1966 | Murray | ................. | F16K 1/2028 251/303 |
| 3,307,633 | A | * | 3/1967 | Newall | ................ | A62C 35/605 169/20 |

(Continued)

FOREIGN PATENT DOCUMENTS

| DE | 36 43 152 | 7/1987 |
| FR | 2 588 806 | 4/1987 |
| WO | 2005 064038 | 7/2005 |

OTHER PUBLICATIONS

International Search Report Issued Jun. 6, 2012 in PCT/FR11/52375 Filed Oct. 12, 2011.

*Primary Examiner* — John Bastianelli
*Assistant Examiner* — Andrew J Rost
(74) *Attorney, Agent, or Firm* — Oblon, McClelland, Maier & Neustadt, L.L.P.

(57) ABSTRACT

An isolation valve including a mechanism for reinforcing closure. The valve includes a seat against which a flap valve member is fitted in a closed position, and a locking finger presents movement defined by a control mechanism configured to press the finger against the valve member in the closed position.

8 Claims, 4 Drawing Sheets

(56) References Cited

U.S. PATENT DOCUMENTS

| | | | | |
|---|---|---|---|---|
| 3,543,789 | A | * | 12/1970 | Wheatley ............... F16L 55/46 137/544 |
| 4,022,421 | A | * | 5/1977 | Carlin ..................... A62C 2/12 137/527 |
| 4,561,630 | A | * | 12/1985 | McCulloch ........... A62C 35/02 137/527.4 |
| 4,690,296 | A | * | 9/1987 | Elliott ................... B64D 11/02 220/259.2 |
| 4,854,342 | A | * | 8/1989 | Polan .................... A62C 35/68 137/516.29 |
| 6,000,473 | A | * | 12/1999 | Reilly ................... A62C 35/68 169/17 |
| 6,029,749 | A | * | 2/2000 | Reilly ................... A62C 35/62 169/17 |
| 6,158,520 | A | * | 12/2000 | Reilly ................... A62C 35/68 169/17 |
| 2006/0162659 | A1 | | 7/2006 | Schussler et al. |
| 2008/0086948 | A1 | | 4/2008 | Schussler et al. |
| 2009/0261285 | A1 | | 10/2009 | Quinn et al. |

* cited by examiner

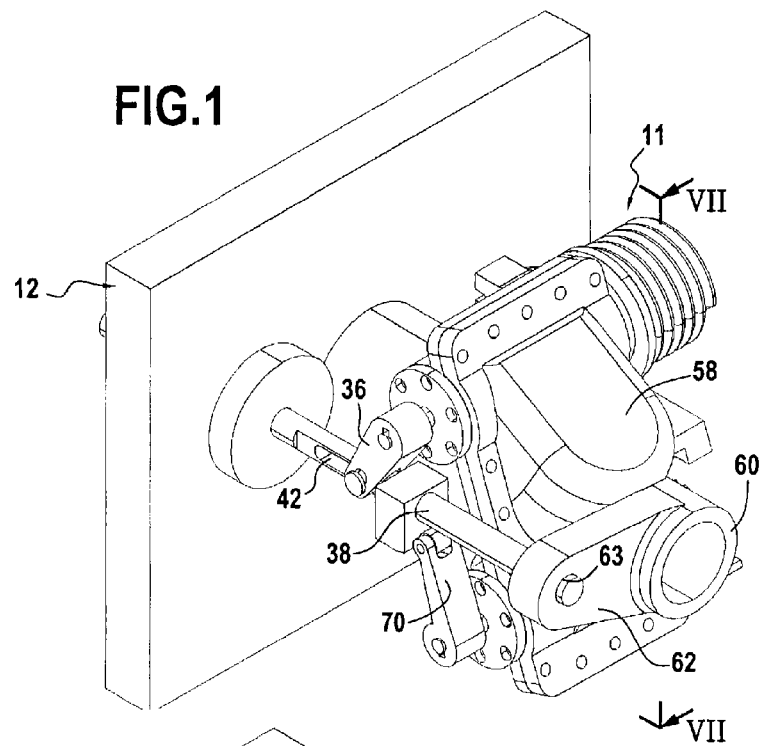
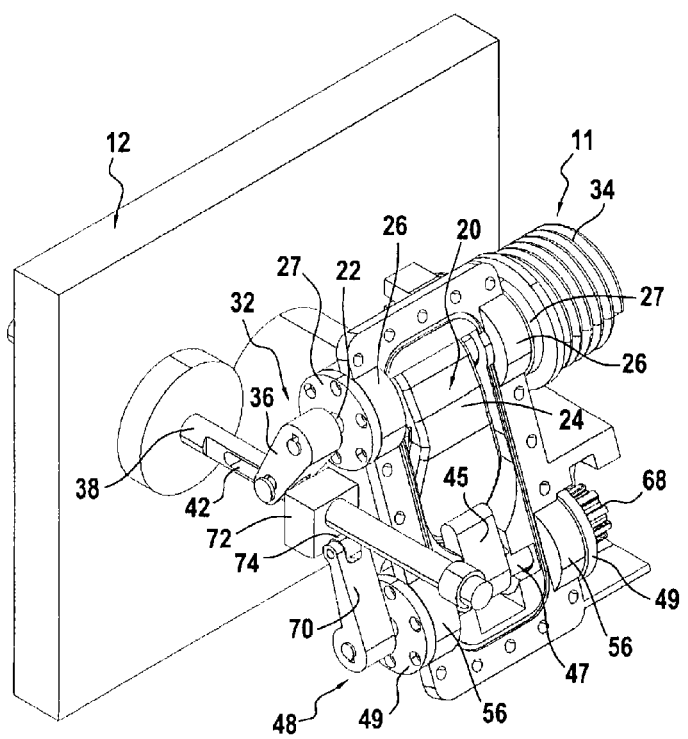

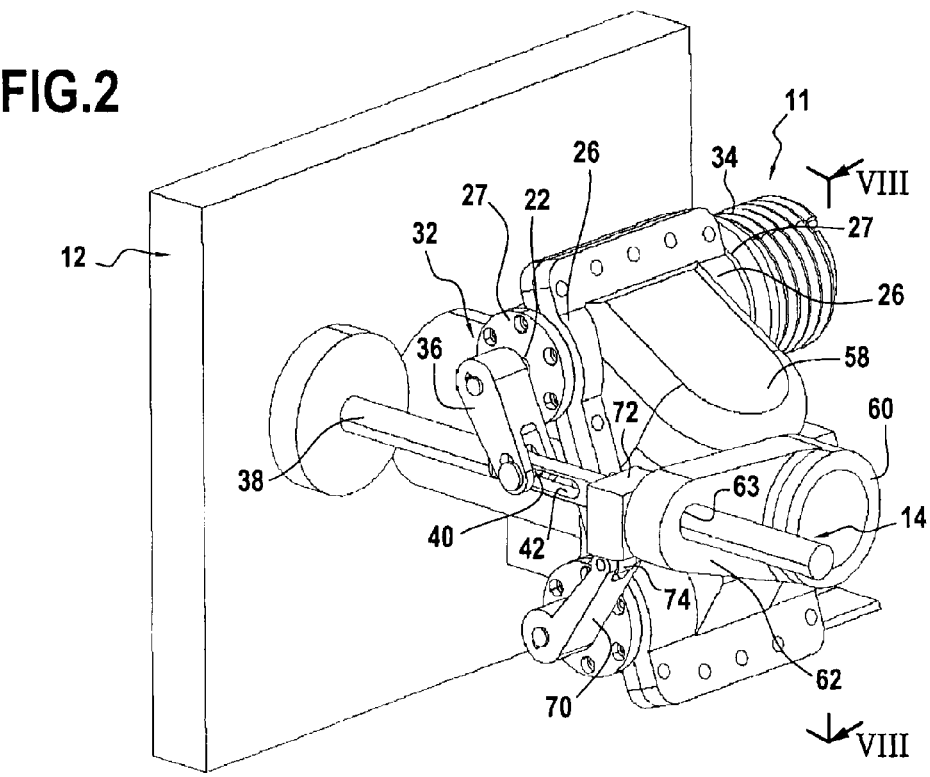
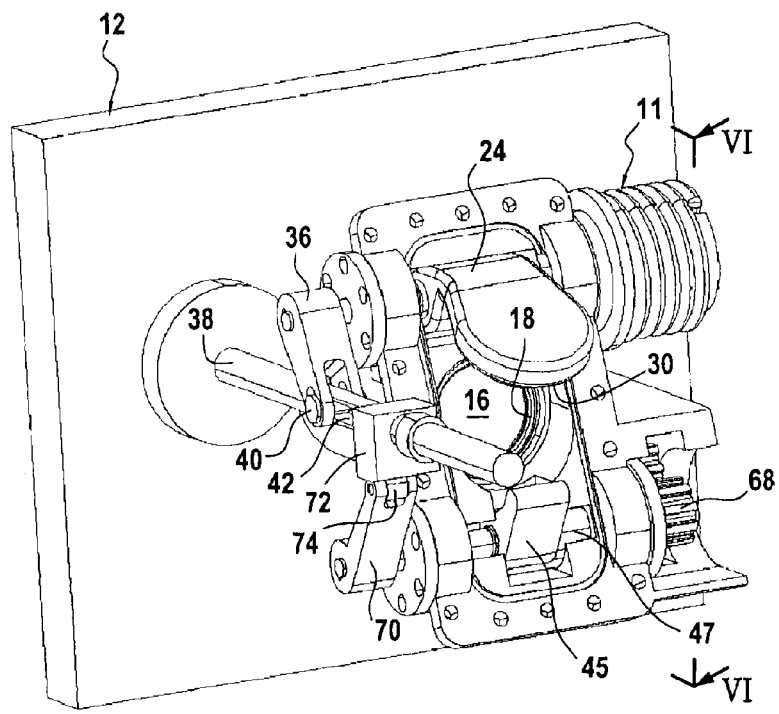

CONTROLLED ISOLATION VALVE HAVING REINFORCED SEALING

BACKGROUND OF THE INVENTION

Field of the Invention

The present invention relates to a controlled isolation valve with reinforced sealing for a fluid flow circuit, the valve presenting little head loss in an open position and excellent sealing in a closed position. A preferred field of application relates to filling and/or degassing a rocket tank.

Description of the Related Art

A valve is known that is adapted to the above-mentioned use. It presents a valve member of the poppet type co-operating with a seat, movement of the valve member taking place axially in the center of the passage for the flowing fluid. Such a valve is generally effective from a mechanical and functional point of view. In particular, sealing in the closed position is excellent, but the location of the valve member in the open position in the center of the fluid flow passage gives rise to significant head loss, thereby in particular increasing the time required for filling the tank in the intended field of application.

BRIEF SUMMARY OF THE INVENTION the invention enables that problem to be solved.

More particularly, the invention relates to a controlled isolation valve for a fluid circuit, the valve being of the type comprising a valve member and a tubular connection segment for passing a flow of said fluid and having a seat on which said valve member comes to rest in a closed position, the valve being characterized in that said valve member is of the flap type that is pivotally mounted on a first pin beside said seat and extending perpendicularly to an axial direction of said connection segment, in that a first control mechanism is coupled to said valve member to open and close it, and in that a locking finger is pivotally mounted on a second pin beside said seat and extending perpendicularly to said axial direction, the movement of said finger being defined by a second control mechanism for causing it to press against said valve member in the closed position.

Thus, in the open position, the seat of the valve is completely disengaged since the valve member lies outside the flow passage. It is thus possible to fill a tank more quickly, for example. In the closed position, the valve member is firmly pressed against its seat by the locking finger.

Advantageously, the valve is also characterized in that said first control mechanism includes a first spring mounted to drive said valve member towards its closed position.

According to another advantageous characteristic, the valve is characterized in that said second control mechanism includes a second spring mounted to drive said locking finger to bear against said valve member in the closed position.

For example, said first spring is a helical spring mounted around said first pin and fastened between the pin and a fixed point, said first pin being secured to said valve member.

In a possible embodiment, said second spring is constituted by a stack of deformable washers arranged on a thrust rod forming a portion of said second control mechanism, the stack being in abutment between a fixed point and a shoulder of said rod.

Advantageously, the force developed by the second spring is considerably greater than the force developed by the first spring.

Advantageously, the stroke of the valve member under drive from the first spring is large, about 180°, so as to disengage the seat completely and avoid disturbing the fluid flow passage.

In contrast, and advantageously, the stroke of the locking finger under drive from the second spring is smaller, of the order of 30°, and movement along this stroke is offset in time relative to movement along the stroke of the valve member so that the locking finger cooperates with the valve member only at the end of its closure stroke. Naturally, on opening, the locking finger disengages first.

Advantageously, the synchronization of those two movements, i.e. the movement of the valve member and the movement of the locking finger, is the result of the way the first and second control mechanisms are arranged, which mechanisms include a common actuation rod, as described below.

For example, said first pin is fastened to a first lever coupled to said actuation rod with predetermined clearance in its longitudinal direction.

This defines lost motion between the actuation rod and lever. This enables the locking finger to disengage at least in part before the opening stroke of the valve member or to come to bear thereagainst at the end of its closure stroke.

BRIEF DESCRIPTION OF THE SEVERAL VIEWS OF THE DRAWINGS

The invention can be better understood and other advantages thereof appear more clearly in the light of the following description of a presently preferred embodiment of a valve in accordance with the principle of the invention, described solely by way of example and with reference to the accompanying drawings, in which:

FIG. 1 is a rear left outside perspective view of the valve in a closed position;

FIG. 2 is a view analogous to FIG. 1 showing the valve in an open position;

FIG. 3 is a view analogous to FIG. 1, the cover being removed;

FIG. 4 is a view analogous to FIG. 2, the cover being removed;

DETAILED DESCRIPTION OF THE INVENTION

Figure 5:
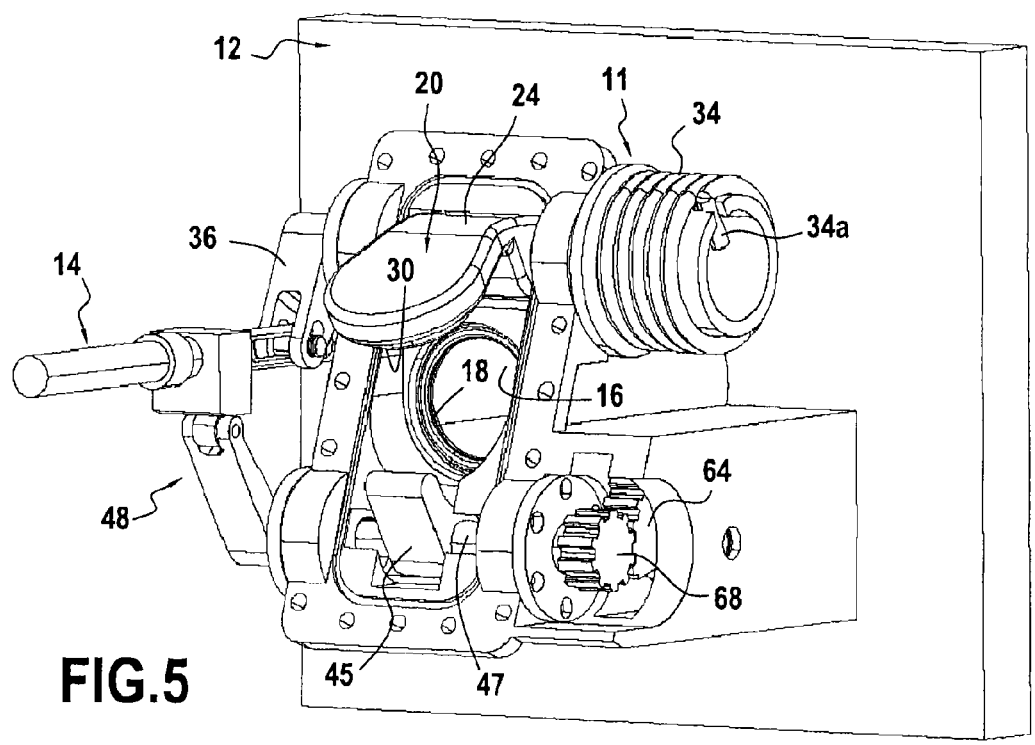
FIG. 5 is a rear right outside perspective view of the valve in the open position, the cover being removed.
Figure 8:
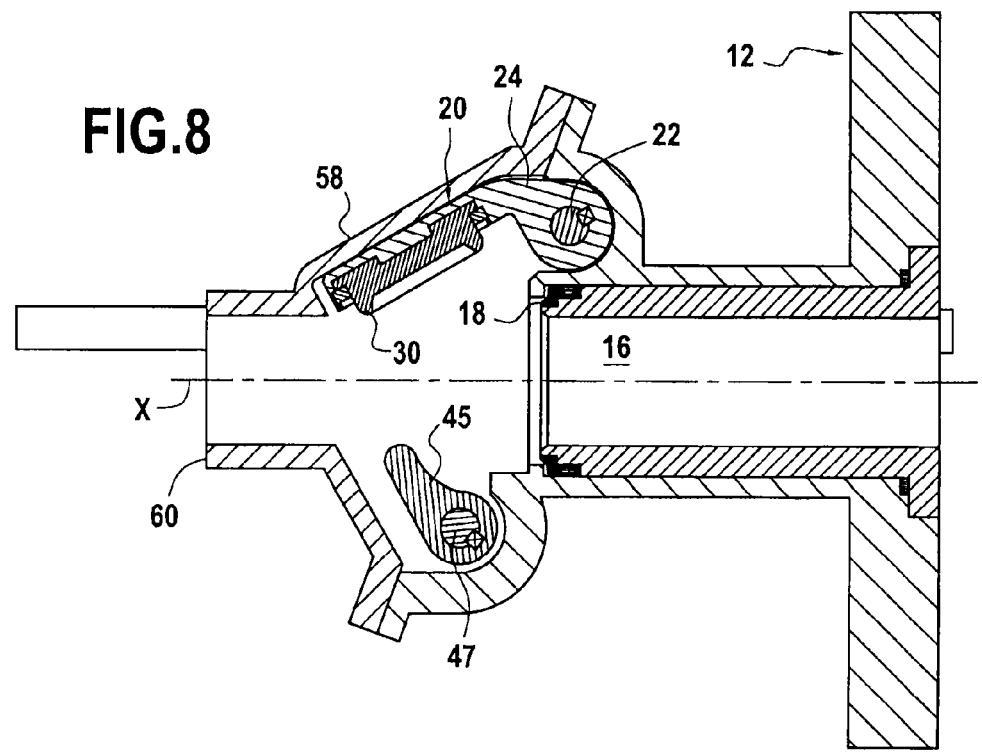
FIG. 8 is a section on VIII-VIII of FIG. 2.
Figure 7:
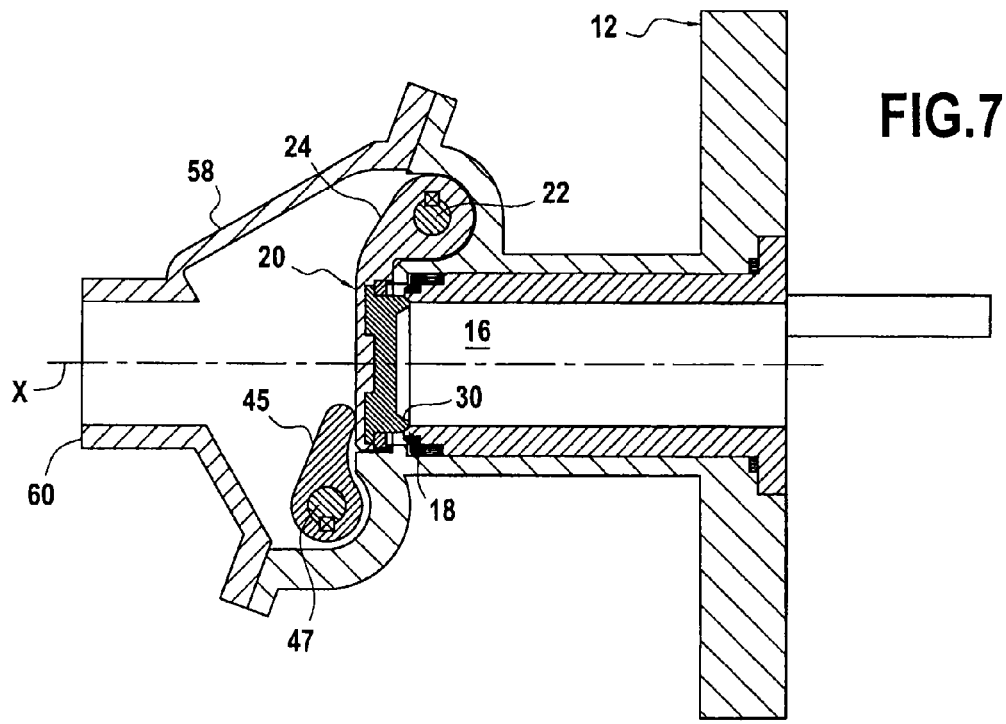
FIG. 7 is a section on VII-VII of FIG. 1.
Figure 6:
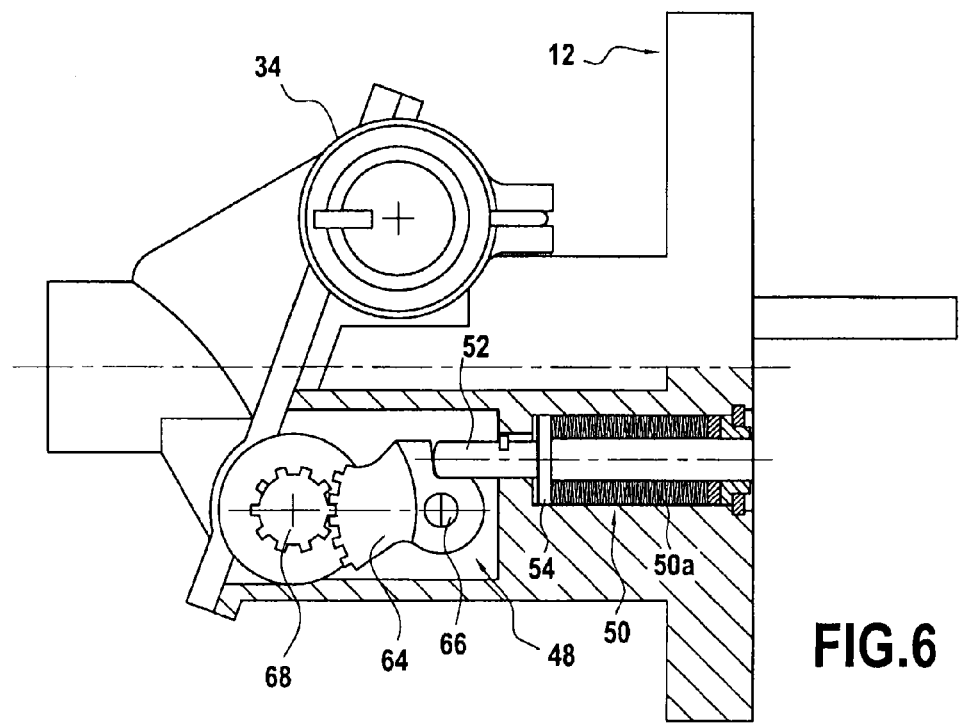
FIG. 6 is a section on VI-VI of FIG. 4.

In the drawings, there can be seen the isolation valve 11 in accordance with the invention shown from the inside, i.e. mounted on a wall 12 that may itself be installed on a rocket fuel tank or may form part thereof. The valve body 14 in this example comprises a tubular connection segment 16 perpendicular to the wall 12 and attached thereto. The segment 16 opens to the outside, i.e. to the other side of the wall 12 for connection to a complementary fitting (not shown) forming part of ground equipment for filling or emptying the propellant tanks of the rocket.

The inside free end of this connection segment forms a seat 18 for a valve member 20. This valve member is of the flap type, being pivotally mounted about a first pin 22 beside the seat. The pin is perpendicular to an axial direction X of the connecting segment 16 and, in the example shown, parallel to the wall 12.

In this example, the valve member 20 has an arm 24 constrained to move in rotation with the pin 22, which pin is hinged between two parallel end plates 26 of the body of the valve that form a clevis. Two sealing plates 27 are fastened respectively to the two end plates, on the outside of the clevis.

The valve member is fitted with a sealing lining 30 that comes into contact with the seat 18 in the closed position.

A first control mechanism 32 is coupled to the valve member 20 to open and close it. More precisely, this mechanism comprises, on one side of the clevis (26-26), a first helical spring 34 mounted to urge the valve member towards its closed position. On the other side of the clevis, the mechanism has a first lever 36 secured to the pin 22 and coupled to an actuation rod 38, which rod is movable perpendicularly to the wall 12.

The helical spring 34 is mounted on said first pin 22 and is fastened between the pin and a fixed point. For example, one end of the spring may be fastened to the wall 12 and the other end 34a may be fastened to the pin 22. As can be seen in the drawings, the pin 22 is extended in the form of a portion of larger diameter that receives the spring, and said other end 34a of said spring is curved and engaged in a notch in said portion.

Said first lever 36 is coupled to said activation rod 38 with predetermined clearance in its longitudinal direction. For example, said first lever comprises a tenon 40 engaged in a longitudinal slot 42 of the actuation rod.

Furthermore, the system also includes a locking finger 45 pivotally mounted on a second pin 47 beside the seat and perpendicular to said axial direction X of the connection segment 16. The movement of the locking finger 45 is defined by a second control mechanism 48 designed to cause it to press against the valve member 20 in the closed position. In this way (after the tank has been filled), the locking finger 45 confirms the application of the valve member 20 against its seat 18, thereby reinforcing the sealing provided by the isolation valve 11, with the application force that is developed by the locking finger 45 being considerably greater than the force applied to the valve member in order to bring it up to its seat 18.

For this purpose, said second control mechanism includes a second spring 50 mounted to urge the locking finger 45 to bear against the valve member 20 in the closed position. The force developed by this second spring 50 is considerably greater than the force developed by the first spring 34.

In this example, the second spring 50 is constituted by a stack of deformable washers 50a (e.g. Belleville washers) engaged on a thrust rod 52 forming a portion of said second control mechanism 48. The stack is in abutment against a stationary point, typically the wall 12, and against a shoulder 54 of the thrust rod.

The second pin 47 is pivotally mounted between two parallel end plates 56 defining a clevis. The locking finger 45 secured to the second pin 47 pivots inside the clevis. Two sealing plates 49 are fastened respectively to the two end plates on the outside of the clevis (56-56). It can be seen that the two clevises hold the two pins 22 and 47 (the pin of the valve member and the pin of the locking finger) on either side of the seat 18. The two pins are parallel. The two above-mentioned clevises are defined in a single molded or machined part forming a portion of a support fastened to the wall 12 and surrounding the connection segment 16. This support includes a join plane on which a cover 58 is fastened. Said cover encompasses the valve member 20 and the locking finger 45 without interfering with their strokes. The cover includes an outlet orifice 60 and a lateral extension 62 that is pierced by a guide hole 63 in which the rod 38 slides. The second control mechanism 48 includes a gearing system extending between the thrust rod and the second pin 47, outside the clevis (56-56). This gearing system comprises a gear 64 mounted to rotate on a stationary pin 66 and a gear 68 fastened to the end of the pin 47 and meshing with the gear 64. The gear 68 drives the pin in rotation and consequently drives the locking finger in rotation. The rod 52 has a rounded end in contact with a hollow in the gear 64.

On the other side, said second pin 47 is fastened to a second lever 70 and the actuation rod 38 carries a cam 72. The end of the second lever 70 is in contact with the cam, which cam has a profile that determines the movement of the locking finger 45. Advantageously, the end of the second lever is provided with a freely-rotatable roller 74 in contact with the cam.

It can thus be seen that the first and second control elements 32 and 48 include an element in common, namely the actuation rod 38. The position of the slot 42 relative to the cam 72 and the profile of the cam determine the respective movements of the valve member 20 and of the locking finger 45, and also synchronize those two movements.

Operation stems clearly from the above description.

With the valve closed, the rod 38 projects outside the wall 12, and the second lever 70 under drive from the second spring 50 holds the rod in this position. Simultaneously, it is clear that the locking finger 45 bears firmly against the valve member 20 under drive from the second spring, thereby guaranteeing excellent sealing. If it is desired to open the valve, it suffices, for example, to connect filling equipment that is fastened to the outside of the wall 12 (by means that are not visible in the drawings). Merely connecting the equipment in this way also has the consequence of pushing in the rod 38. Consequently, the cam 72 acts immediately on the second lever and on the second pin, thereby causing the locking finger 45 to pivot. As from this moment, the valve member is held on its seat solely by the force developed by the first spring 34. When the first lever 36 comes into contact with the end of the slot 42, it begins to pivot, thereby opening the valve member 20 and disengaging it completely from the seat 18. Filling can thus be performed without any head loss resulting from the valve member. At the end of filling, merely withdrawing the connection equipment begins by causing the valve member 20 to close and then causes this closure to be confirmed by the locking finger 45 pivoting.

The invention claimed is:

1. A controlled isolation valve for a fluid circuit, comprising:
   a valve member; and
   a tubular connection segment passing a flow of a fluid and including a seat on which the valve member comes to rest in a closed position;
   wherein the valve member is of flap type that is pivotally mounted on a first pin beside the seat and extending perpendicularly to an axial direction of the connection segment;
   a first control mechanism coupled to the valve member to open and close the valve member; and
   a locking finger pivotally mounted on a second pin beside the seat and extending perpendicularly to the axial direction, movement of the finger being defined by a second control mechanism for causing the finger to press against the valve member in a closed position;

wherein the first control mechanism includes a first spring mounted to drive the valve member towards its closed position, wherein the first spring is a helical spring mounted around the first pin and is fastened between the pin and a fixed point, the first pin being secured to the valve member, and wherein the first and second control mechanisms include a common actuation rod.

2. An isolation valve according to claim 1, wherein the second control mechanism includes a second spring mounted to drive the locking finger to bear against the valve member in the closed position.

3. An isolation valve according to claim 2, wherein the second spring includes a stack of deformable washers arranged on a thrust rod forming a portion of the second co o mechanism, the stack being in abutment between a fixed point and a shoulder of the rod.

4. An isolation valve according to claim 3, wherein the second control mechanism includes a gearing system extending between the thrust rod and the second pin, driving the locking finger in rotation.

5. A valve according to claim 1, wherein the first pin is fastened to a first lever coupled to the actuation rod with predetermined clearance in a longitudinal direction thereof.

6. A valve according to claim 5, wherein the first lever includes a tenon engaged in a longitudinal slot of the actuation rod.

7. A valve according to claim 1, wherein the second pin is fastened to a second lever, the actuation rod carries a cam, and the second lever includes an end in contact with the cam, a profile of he cam determining movement of the locking finger.

8. A valve according to claim 7, wherein the end of the second lever includes a freely rotatable roller in contact with the cam.

* * * * *